(12) United States Patent
Lor et al.

(10) Patent No.: US 10,187,360 B2
(45) Date of Patent: Jan. 22, 2019

(54) METHOD, SYSTEM, SERVER, CLIENT, AND APPLICATION FOR SHARING DIGITAL CONTENT BETWEEN COMMUNICATION DEVICES WITHIN AN INTERNET NETWORK

(71) Applicant: Quiver B.V., Amsterdam (NL)

(72) Inventors: Django Alexander Lor, Amsterdam (NL); Yanick Alain Glenn Finsy, Amsterdam (NL); Eric Schreiber, Amsterdam (NL)

(73) Assignee: QUIVER B.V., Amsterdam (NL)

( * ) Notice: Subject to any disclaimer, the term of this patent is extended or adjusted under 35 U.S.C. 154(b) by 130 days.

(21) Appl. No.: 15/337,656

(22) Filed: Oct. 28, 2016

(65) Prior Publication Data

US 2017/0126636 A1    May 4, 2017

(51) Int. Cl.
| | | |
|---|---|---|
| *G06F 21/00* | (2013.01) |
| *H04L 29/06* | (2006.01) |
| *G06F 21/10* | (2013.01) |
| *H04L 9/08* | (2006.01) |
| *H04W 12/04* | (2009.01) |
| *H04W 12/08* | (2009.01) |
| *H04L 9/32* | (2006.01) |
| *H04L 29/08* | (2006.01) |

(52) U.S. Cl.
CPC .......... *H04L 63/0442* (2013.01); *G06F 21/10* (2013.01); *H04L 9/0872* (2013.01); *H04L 9/3213* (2013.01); *H04L 63/08* (2013.01); *H04L 63/107* (2013.01); *H04L 63/108* (2013.01); *H04W 12/04* (2013.01); *H04W 12/08* (2013.01); *G06F 2221/2111* (2013.01); *G06F 2221/2137* (2013.01); *H04L 67/18* (2013.01); *H04L 2209/60* (2013.01)

(58) Field of Classification Search
CPC ............ H04L 63/0442; H04L 63/0435; H04L 63/108; H04L 63/107; H04L 63/08; G06F 21/10
See application file for complete search history.

(56) References Cited

U.S. PATENT DOCUMENTS

| 2005/0055552 | A1* | 3/2005 | Shigeeda ............ H04L 63/0442 |
| | | | 713/171 |
| 2005/0193203 | A1 | 9/2005 | Freeman et al. |
| 2010/0217975 | A1* | 8/2010 | Grajek .................. G06F 21/445 |
| | | | 713/157 |

(Continued)

FOREIGN PATENT DOCUMENTS

WO    02/37222 A2    5/2002

OTHER PUBLICATIONS

Search Report for NL Patent Application No. 1041549 dated May 24, 2016.

*Primary Examiner* — Beemnet W Dada
(74) *Attorney, Agent, or Firm* — Shumaker, Loop & Kendrick, LLP

(57) ABSTRACT

A method, system, server, client and application for encrypting digital information such as documents and images for safe controlled sharing of those documents over an internet network. The method includes at least requesting and validating login credentials, generating server and client key pairs, key encryption, transmission to a sandbox environment, and decrypting for use by the first communication device.

10 Claims, 2 Drawing Sheets

(56) References Cited

U.S. PATENT DOCUMENTS

| | | | |
|---|---|---|---|
| 2011/0126022 A1* | 5/2011 | Sieberer | H04L 9/0825 |
| | | | 713/180 |
| 2013/0275765 A1 | 10/2013 | Lay | |
| 2014/0115668 A1 | 4/2014 | Stuntebeck et al. | |
| 2015/0381618 A1* | 12/2015 | Lin | H04L 63/0869 |
| | | | 713/169 |
| 2016/0344557 A1* | 11/2016 | Chabanne | H04L 9/3066 |

* cited by examiner

METHOD, SYSTEM, SERVER, CLIENT, AND APPLICATION FOR SHARING DIGITAL CONTENT BETWEEN COMMUNICATION DEVICES WITHIN AN INTERNET NETWORK

TECHNICAL FIELD

The present invention relates generally to the field of securing digital information to be used, shared and controlled by users of the system, and more particularly, to a method, system, server, client and application for encrypting digital information such as documents and images for safe controlled sharing of those documents over an internet network.

BACKGROUND OF THE INVENTION

The amount of digital communication devices such as tablets, smartphones, laptops and personal computers is these days rapidly increasing. Communication between these devices is facilitated by vast global packet switched telecommunication networks linking all devices together and enabling high speed communication between all devices. The amount of digital information stored on node within, and communicated over these telecommunication networks is ever increasing.

With the large amount of devices being arranged to access the digital information and redistribute it towards further, often unwanted, third parties and devices, the safe protection of, and control over the digital information is getting more and more challenging these days.

More and more information can be considered sensitive information, for example relating to identity, access codes, business information, personal information, etc. Securing these documents with conventional security methods such as password protections, encryptions and the like can help to increase security, but mostly has a negative effect on flexibility. If information is share which is password protected, an additional step of providing the password is required, preferable via a different medium as by which the original information was transmitted.

Moreover, when the password is provided, or when information is encrypted, the owner of the information loses control over the information once the password protection has been overcome, or when the information, e.g. file/document has been decrypted. Conventional and traditional methods known in the art are not able to share information wherein not only security is guaranteed, but wherein full control is maintained, even after the information has been shared.

As such, it is an object of the present invention to provide an improved method and system for sharing digital information over a packet switched telecommunication network.

It is a further object of the present invention to provide an improved method and system for sharing digital information over a packet switched telecommunication network with improved security of the information and increased control over the information even after the information has been shared.

BRIEF SUMMARY

In a first aspect, there is provided a method of sharing digital content between communication devices in an internet network, the internet network comprising at least a server and a first communication device, the method including the steps of:

initiating, by the first communication device, a secure tunnel over the internet for further secure communication between the first communication device and the server;
requesting, by the first communication device, login credentials from a user of the first communication device;
validating, by the server, the login credentials received from the first communication device;
requesting, by the first communication device, the digital content from the server;
generating, by the server, a instance of digital content;
generating, by the server, a server key pair comprising a private server key and public server key;
generating, by the first communication device, a client key pair comprising a private client key and public client key;
sending, by the first communication device, the public client key to the server;
sending, by the server, the public server key to the client;
leveraging the public keys of the client and server for public-private key encryption as a transport layer for the following steps;
encrypting, by the server, the instance of the digital content, with both the server key component and client key component interwoven;
transmitting, by the server, the encrypted instance of the digital content, to a sandbox environment within the first communication device;
sending, by the server, the server key component, to the first communication device;
decrypting, by the first communication device, within the sandbox environment the encrypted instance of the digital content with the interwoven server and client key components, for use by the user of the first communication device.

With the rise in the amount of digital communication devices such as tablets, laptops, smartphones, computers and the like, the amount of digital content communicated between these devices has never been as high as nowadays. Vast global telecommunication networks such as the internet facilitate the exchange of the digital content between the devices by offering high speed broadband internet connections.

The digital content shared can be of various types, such as word documents, excel sheets, pdf documents, pictures, videos or other forms of digital content.

Various methods are known in the art to share the digital content between the devices in a secure manner. It is known to employ secure tunnels over the internet connection by providing encryption between the devices. In an example the encryption can be provided on the bases of a Transport Layer Security, TLS, or its predecessor, Secure Sockets Layer, SSL. These security communication methods employ a certificate and hence asymmetric cryptography to authenticate the party with which a secure communication tunnel is to be established. When the other party is authenticated, a symmetric session key is generated and used to encrypt the data, i.e. the payload, of the communication between both parties, i.e. between the devices of the parties.

Even though known methods for secure communication decrease the risk of tampering upon communication, it does not prevent unwanted use of the data itself. And with the increasing amount of digital content being generated these days, and the increasing amount of digital content being shared between the devices over the internet, keeping control over the digital content is becoming more and more of a challenge, especially if the digital content relates to sensitive information, for example relating to identity, access codes, business information, personal information, etc.

Securing the digital content with conventional security methods such as password protections, encryptions and the like can help to increase security, but mostly has a negative effect on flexibility. If information is share which is password protected, an additional step of providing the password is required, preferable via a different medium as by which the original information was transmitted.

Moreover, when the password is provided, or when information is encrypted, the owner of the information loses control over the information once the password protection has been overcome, or when the digital content, e.g. file/document has been decrypted. Conventional and traditional methods known in the art are not able to share information wherein not only security is guaranteed, but wherein full control is maintained, even after the information has been shared.

The invention is based on the insight that for guaranteeing security and maintaining control, the communication between two devices and use of the content on the receiving device should be performed on a content-per-content basis with content-per-content restrictions, wherein communication is performed over a secure communication tunnel and wherein use of the content can be restricted by only providing access to a decrypted instance of the content at the receiving device, in a restricted area of the device that is under control of the transmitting device.

Hence, in a first example of the present invention a method is provided of sharing digital content such as documents, photo's, video's, etc. between two devices over and internet connection, one device being a first communication device, i.e. a client device of first user, and the other being a server for supporting the method and providing the digital content.

Contrary to known solutions to provide security to documents and to maintain control even when the documents are shared, the present invention provides a solution which is application independent. The known solutions require the document to be handled within a restricted application, e.g. an application that is containerized. The present invention provides the documents with security and maintaining control after being shared at the lowest level within the operating system, at the level of the document itself. The digital content being shared, e.g. the document, photo, video or other file is shared in a safe manner by wrapping the document with a secured envelope. Within an encrypted communication channel the wrapped document is made available to the receiver by the server, e.g. in a cloud solution. The document is however encrypted, in such a way that it can only be decrypted with the correct key. The key is not a single key which, when in possession by the receiver enable the receiver to take full control over the document by decrypting it and then decide whatever further action to take on the document, e.g. copy, edit, print, forward, etc. The key according to an aspect of the invention is an interwoven key which comprises a server side and client side key and can only be used to decrypt the document when both parts of the key are present. That means that the receiver is not able to decrypt the key by only making use of his or her own key. They also need the complementary part of the key of the server such that both in combination can be used to decrypt the document. Accordingly, each document has its own encryption by a unique key. Moreover, a document can have multiple instances, one for every shared instance. If for example an owner of a document decides to share a document, an instance of that particular document is generated and encrypted with a unique key such that the unique key and document are only linked to that particular share action. Once the document is shared and for example restricted to only be viewed for one single day by the specific receiver, the document instance is deleted once the time limit lapsed. Accordingly, no further actions can be taken on the document, without first requiring another instance and the decryption by both the client and server keys. As such, a form of end-to-end encryption is provided wherein the documents shared can only be decrypted at the end terminals of the communication channel. The documents, their instances and the corresponding keys are saved in a database on the server or a database to which the server has access. The connection of the key to the encrypted document is however not directly linkable and must be decrypted before accessing it. The key to decrypt the documents is preferably a key having a client (public client key) and a server key (public server key) element. Parts of data string generated by the client and server key are combined to create an interwoven pattern.

The document is decrypted at the client side within a restricted environment, sandbox environment to maintain control over the document even when decrypted. Contrary to known solutions such environment is not restricted to certain file types only, such as pdf documents or other specific documents with a file type known to be used by certain companies. The environment is also not restricted to a particular application wherein the document once decrypted can only be used by that particular application. The solution provided, provides the document in a manner wherein known file types can be used by the system and the level of control is arranged at the file level, i.e. at the document level. In an example the document itself is sandboxed or containerized, which means that the restriction is on the document itself and control measures are embedded in the container as well, and thus independent from the application.

In an example the two sets of keys are connected with each other, and then randomly matched and ordered, to create a unique random key that will be connected to that document or file, or renewed every time the file is reshared with another receiver. This means that from the server side and application or client side these must match the unique pattern that has been created for that specific key. The receiver's part of the key can only be created in the correct pattern if the reviewer is viewing the document from a known device that is connected to the receiver.

Accordingly, the encryption is in control of the owner of the document, i.e. the user sharing the document. The encryption is preferably related to both the owner, e.g. the sender or server side and the receiver, e.g. the application or client side. However, the encryption can also be related to the devices, e.g. the device on which the document is opened or more in general received. For example a mobile device can be comprised of a public private key pair unique to the device. In some devices these key pairs are available through a hardware module, in other devices this can be provided at operating system level (i.e. kernel space) or at the application level of the operation system by a particular application providing such functionality. By linking or connecting the encryption of the document to the sender (e.g. server), receiver (e.g. client) and receiving device (e.g. client device), the level of control is even further increased.

In a first step, the devices initialize and set-up a secure communication channel, e.g. a TLS or SSL tunnel between the client and server, thus between the first communication device and the server. The set-up of the secure tunnel is initialized by the client on the basis of asymmetric communication wherein the server is authenticated and, upon successful authentication, a symmetric session key is generated for encrypting all further communication between the server and client on the basis of this symmetric session key. Optionally, a compression method can also be employed to both encrypt and compress the data (digital content), i.e. the payload, communicated between both parties.

Once the secure tunnel is established, all further communication between the server and the client takes place over this secure tunnel, by which safe communication between both parties is guaranteed.

The first communication device requests subsequently the login credentials from the user of the first communication device to validate the user. These login credentials could be a simple username and password combination, but also authentication models can be employed, for example a user authentication via an Active Directory wherein a federation is created and authentication is provided through a network login. Also a web based login can be employed, for example according to an oAuth2 or form based authentication model. Preferably the connection between the entities that are used for sharing and the username and password are separated from each other, such that the system does not know the true person digital content is shared with, but only the entity.

After validation, the client, i.e. the first communication device, preferably receives an API key. This API key is user and machine dependent and hence unique for that combination. The API key can preferably be used for all further communication between the client and server, i.e. between the first communication device and the server.

If the user is validated by the system, the user of the first communication device can request the digital content, e.g. the document the user wishes to view. The server then creates a unique instance of that digital content for that particular request.

For that particular instance the server generates a key pair, i.e. private server key and a public server key. Moreover, the client, i.e. the first communication device, generates a key pair as well, i.e. a private client key and a public client key.

Once both the server and client have both generated a key pair, the server sends its public key to the client and requests the public key of the client. The public keys from both parties are used to set up a public-private key encryption layer where the communication can only be decrypted with the private keys only present on the other end of both sides. This is both used as an extra encryption layer as well as a trust layer between the server and client. This is on top op the standard TLS or SSL communication layer.

The instance of the digital content is then encrypted with a key generated by interweaving a server side key component and a client side key component. This way the instance can only be decrypted when in possession of both keys. If a person or device has access to only one of the key components, the person will not be able to decrypt the instance. Each instance gets its own key pair consisting of a server side and client side component such that every instance is encrypted in a different way with a unique encryption.

The encrypted instance is then transferred, i.e. sent, over the secure tunnel from the server to the first communication device and received at the first communication device in a specific part of the operating system, preferably at kernel level control. This specific part of the operating system is isolated from the rest of the operating system such that all communication between the isolated part and the rest of the operating system can be restricted and under full control of the server, or the application employing the method according to the invention that is running on the client and wherein the restrictions of the isolated part are defined by the server.

Such an isolated part of the operating system in which the encrypted instance is received is also known as a sandbox environment and is characterized in that it is a security mechanism to separate the running application, i.e. employing the method according to the invention, from the rest of the operating system. The resources within the sandbox are fully under control of the application, and define certain isolated memory space, network interfaces, disk space, etc.

The isolation via the sandbox environment is preferably arranged at kernel level within the operating system which guarantees a high level of safety and performance. The encrypted instance it thus received within the sandbox environment at the client and decrypted within the sandbox environment. For decryption the combination of the server side key component and the client side key component is needed. Once decrypted the instance can be used by the user of the client, i.e. the first communication device. The use is however not unlimited and unrestricted but restricted according to restriction requirements or privilege parameters for that particular instance. These restriction requirement or privilege parameters are for example related to the time of use of the instance, the location of use, the way in which it can be used, e.g. read only, also write, printing, etc.

If the restriction requirements define a certain time duration restriction for example, then the instance is decrypted within the sandbox at the client. The decrypted instance is destroyed once the time duration has lapsed. This can work in the same way when certain location restrictions are defined. When the first communication device is not at the predefined geolocation, the instance is destroyed. Accordingly, the instance can also be destroyed once the internet connection is disconnected.

In this way, control over the digital content, e.g. a document, can be maintained even when the document is copied to another device and even after decryption.

In another aspect of the invention, there is provided a method of sharing digital content between communication devices in an internet network, the internet network comprising at least a server and a first communication device, the method including the steps of:

initiating, by the first communication device, a secure tunnel over the internet for further secure communication between the first communication device and the server;

requesting, by the first communication device, login credentials from a user of the first communication device;

validating, by the server, the login credentials received from the first communication device;

requesting, by the first communication device, the digital content from the server;

generating, by the server, a instance of digital content; generating, by the server, a server key pair comprising a private server key and public server key;

generating, by the first communication device, a client key pair comprising a private client key and public client key;

sending, by the first communication device, the public client key to the server;

encrypting, by the server, the instance of the digital content, with both the public server and client key, preferably, with a public or private server key component and a public or private client key component, wherein both components preferably are interwoven;

transmitting, by the server, the encrypted instance of the digital content, to a sandbox environment within the first communication device;

sending, by the server, the private or public server key, to the first communication device, and preferably the public server and client key, and more preferably, the public or private server key component and a public or private client key component, wherein both components preferably are interwoven;

decrypting, by the first communication device, within the sandbox environment or containerized digital content instance, the encrypted instance of the digital content with both the private server and client key, or preferably the public server and client key, more preferably, with the public or private server key component and a public or private client key component, wherein both components preferably are interwoven, such for use by the user of the first communication device.

In an example, the step of encrypting, by the server, of the instance of the digital content includes the steps of:

generating, by the server, a document encryption key comprising an interwoven server side key component and client side key component.

In an example, the method further including the step of:

determining, by the server, privilege parameters for the instance of the digital content, wherein the privilege parameters comprise any one or more of the group of: internet connection requirement, print screen protections, copy/paste protection, clipboard protection, print protection, and wherein the sandbox environment is arranged to restrict use of the decrypted instance of the digital content on the first communication device in accordance with the privilege parameters.

The instance can comprise privilege parameters or restriction requirement that determine how the instance can be used. The privilege parameters are set by the owner of the original file from which the instance is created. This way the user maintains control over the file even when the file is copied and present on a device that is not under control of the user.

In an example, the method further including the step of:

determining, by the server, time protection parameters for the instance of the digital content, wherein the time protection parameters comprise any one or more of the group of: expiration time moment, expiration time duration, expiration time duration from time moment, and wherein the sandbox environment is arranged to restrict use of the decrypted instance of the digital content on the first communication device for a time duration in accordance with the time protection parameters.

In an example, the method further including the step of:

determining, by the server, geolocation parameters for the instance of the digital content, wherein the geolocation parameters comprise any one or more of the group of: a geolocation for use of the instance of the digital content, a radius for the geolocation, and wherein the sandbox environment is arranged to restrict use of the decrypted instance of the digital content on the first communication device at a geolocation in accordance with the geolocation parameters.

The instance can comprise restriction to the time when the instance may be used, and/or to the geographical location where the instance may be used. Time protection is under control of the server, and defined in the time protection parameters of a particular instance. To determine the current time, and define if the time duration period as defined has lapses, the system does not make use of the system clock of the client, but from a clock provided elsewhere, for example that of the server, or a remote time server such as an NTP server.

In an example, the geolocation parameters further include a geolocation code, physically present at the geolocation, and wherein the method further includes the step of:

sending, by the first communication device, the geolocation code at the geolocation to the server;

determining, by the server, whether the geolocation code corresponds to a geolocation code stored with the geolocation parameters of the instance of the digital content, for performing the step of decrypting, by the first communication device, within the sandbox environment the encrypted instance of the digital content upon matching geolocation code sent by the first communication device, and the geolocation code on the server corresponding to the instance of the digital content.

In an example, the check of the geolocation is provided as a QR code, and wherein the QR code is preferably refreshed periodically, preferably approximately every few seconds.

In an example, the method further including the step of:

sending, by the first communication device, within a heartbeat system, periodically a current geolocation to the server, preferably approximately every few seconds.

The geolocation protection preferably makes use of a two-factor authentication process to validate the user in a correct area. The client that is registered with the system will be requested to verify the location via a QR code. The QR code is refreshed every 3 seconds. This makes it hard to copy and send the QR code to a different location. The client can preferably make use of a heartbeat system that sends the current location on regular basis. If the system notices that the user has changed location within a few seconds, the geolocation protected instance is closed and will not open again.

In an example, the digital content shared between the communication devices is comprised of an image or video, and the method further includes the step of:

dividing, by the server, the digital content into multiple blocks;

assigning, by the server, a position identifier to each of the blocks; and wherein the step of transmitting, by the server, of the instance of the digital content comprises transmitting, by the server, in one or more stream connections, the blocks to the client; and wherein method further comprises the step of recombining, by the first communication device, each of the blocks into the digital content on the basis of the position identifiers.

In order to prevent users to obtain images or videos, without consent of the owner of the images or videos, the method preferably is arranged to divide the image, or a video, or each image of a sequence of images forming a video, into multiple blocks. These blocks, or tiles will be divided server-side and will be recombined to the original image or video at client-side. Each of the blocks has a unique position identifier, defining the exact position of the block on the screen and hence, in relation to the other blocks. In a simple embodiment, this can be implemented by assigning no. 1 to the top left tile or block on the screen, and the next block on the right no. 2, all the way to the last block in the bottom right corner. However, also these numbers can be assigned random, as long as the correct sequence is transmitted to the client, such that the client can re-combine the blocks into the original image or video on the basis of that sequence. The sequence can for example be, from top left corner to bottom right corner, 21, 14, 5, 1, 22, etc. wherein each number represent is position identifier of a block. The blocks can be transmitted in a single communication link, i.e. a single (secured/encoded) stream connection, or over multiple communication links, for example one per block. The server then transmits with the block an encoded URL and key to connect for the next link comprising the next block(s). The URL is preferably expired in a very short time duration such as a few seconds or even 1 second, this to prevent tampering or hacking by reverse-engineering. In this way the ability for a user to abuse or misuse of the image or video is limited, since the operating system on the clients communication device is not able to save the image by standard save commands within an application such as an internet browser, due to the image being a composition of multiple blocks that are created by and under control of the application providing digital content by the server, hence the method according to the invention.

In a second aspect, there is provided a server, arranged for use in the method according to any of the previous descriptions.

In a third aspect, there is provided a communication device arranged for use in the method according to any of the previous descriptions, wherein the communication device preferably is one of the group of: a mobile communication device such as a smartphone or tablet a portable communication device such as a laptop and a personal computer device.

In a fourth aspect, there is provided a product comprising optically readable information arranged for use in the method according to any of the previous descriptions.

In a fifth aspect, there is provided a computer program product comprising a data storage device storing computer program code data arranged for performing the method according to any of the previous descriptions, when the program code data are loaded into a memory of a server and are executed by the server.

In a sixth aspect, there is provided a computer program product including a data storage device storing computer program code data arranged for performing the method according to any of the previous descriptions when the program code data are loaded into a memory of a personal computer, portable or mobile communication device such as a tablet, laptop, smartphone and the like, and are executed by the personal computer device, portable or mobile communication device.

The invention will now be described in more detail by means of specific embodiments, with reference to the enclosed drawings, wherein equal or like parts and/or components are designated by the same reference numerals. The invention is in no manner whatsoever limited to the embodiments disclosed.

DETAILED DESCRIPTION

Figure 1:
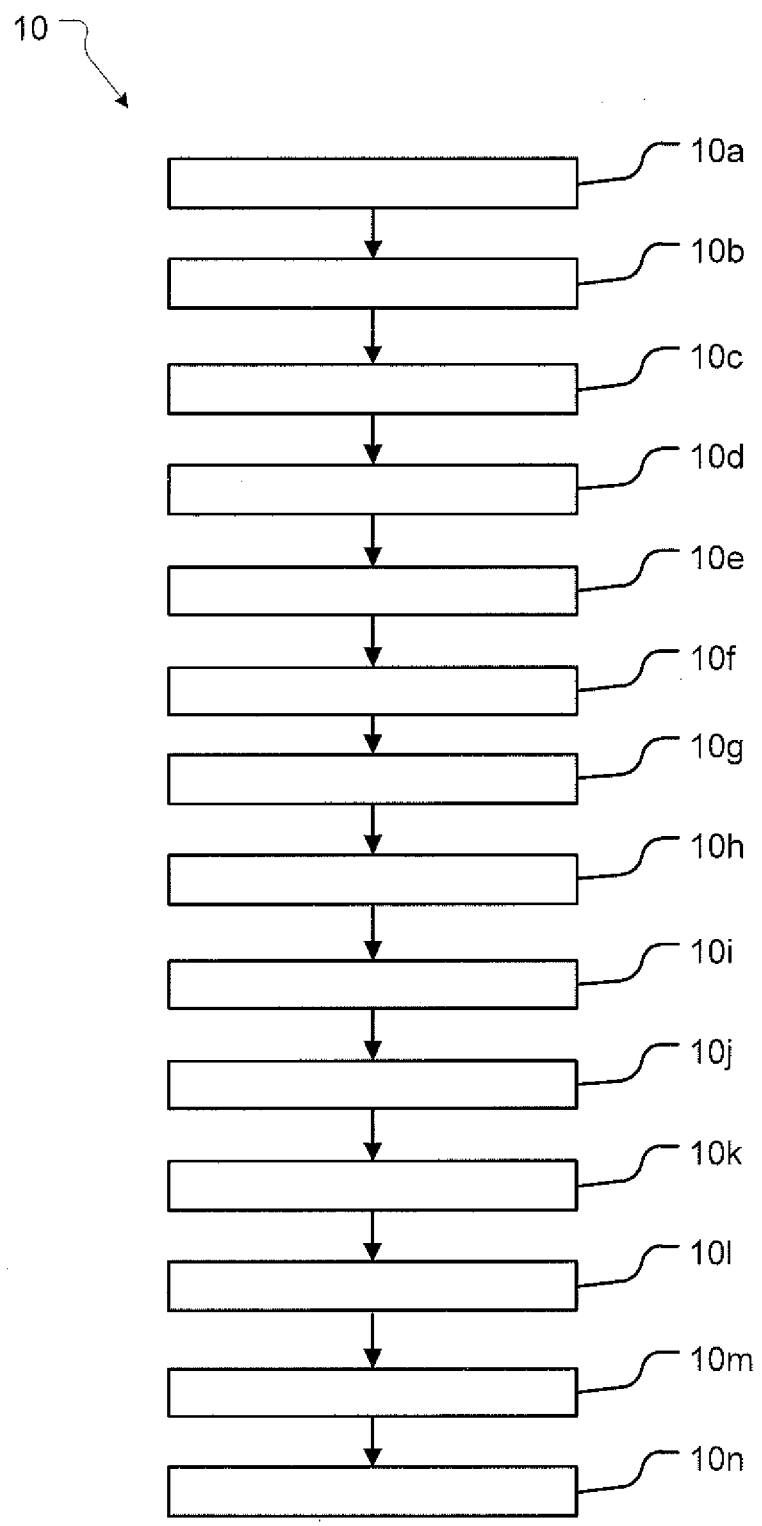
FIG. 1 shows, a block diagram of the step of the method according to an aspect of the invention.

In FIG. 1 the steps 10 of the method according to an aspect of the invention are shown. The steps enable sharing of digital content such as images, videos, documents, or any other form of digital media or files. The digital content is shared in principle between a client device and a server, and preferably between a client and another client, all via the server and within an internet network. The internet network should not to be interpreted restrictively. Any network wherein communication is possible between communication devices and wherein data can be transported over the network comply. The method can be implemented as a client application running on the communication device of the user, which communicates with a server application running on the server. The combination of the server application and the client application is considered the software system, and the server and client device as the hardware system. The combination is referred to as the system. The server can be any server arranged to perform the server side steps of the method, hence a conventional physical server located remote of the client device, or a virtual (cluster of) server(s).

In the first step 10a of the method 10, the first communication device initiates 10a a secure tunnel over the internet for further secure communication between the first communication device and the server. In the next step 10b, the first communication device requests 10b, login credentials from a user of the first communication device. These are then validated 10c in the next step 10c by the server, and subsequently the first communication device in the next step 10d requests 10d the digital content from the server. Then, in the next step 10e, the server generates 10e, an instance of digital content and generates 10f a server key pair comprising a private server key and public server key. The first communication device in the next step 10g, generates 10g a client key pair comprising a private client key and public client key and then sends 10h, that public client key to the server. The server in step 10i sends its public server key to the first communication device and in step 10j these public keys of the server and first communication device, i.e. the client, are leveraged for public-private key encryption as a transport layer for the next steps. In the next step 10k, the server then encrypts 10k the instance of the digital content, with an interwoven generated server side key component and a client side key component. Thus a secure (symmetric) document key is generated from these server side key component and client side key component. Next, in step 10l the encrypted instance of the digital content is transmitted 10l, to a sandbox environment within the first communication device. The server then sends 10m, the server key component, to the first communication device wherein in the final step 10n the first communication device decrypts 10n, within the sandbox environment, the encrypted instance of the digital content with the interwoven server side and client side key components, for use by the user of the first communication device.

With the system the users of the system are provided with tools to maintain control over their digital content, e.g. documents, videos, photos, etc., by protecting/securing, tracking and maintaining control after sharing. Each part of the system, e.g. each step of the method, can be hosted in a different environment, depending on needs and requirements of the end users. Thus data can be stored and retrieved in separate databases and physical storage of the digital content can be arranged on a cloud base, a local storage base, or dedicated remote base, or a hybrid combination. Via a data layer the server is able to access all data sources and all data, i.e. digital content, stored thereon. This can be application dedicated storage(s) or remote external known storage(s) such as Dropbox, Google Drive, one drive, FTP, network shares, local hard drives, etc. All content is stored through the software application according to the invention and automatically secured accordingly. Preferably, all content is stored redundantly and the software system is a multi-tenant architecture, which allows both shared and isolated instances to be used.

The digital content is embedded in a digital envelope container, which can be opened by the original application making the user experience as normal as possible. The encryption used is considered a high industry standard. For each of the digital content, unique keys, are generated and used to encrypt. When the content is shared, i.e. transmitted to a communication device, thus a client, it receives new key components, that are only valid for that shared instance and for that specific user with which that instance of the digital content is shared.

The software system, as indicated, makes uses of two secret key components. These keys are combined in an interwoven pattern creating one secure key. Each document, i.e. the digital content, gets its own secure key, so that every document is encrypted in a different way. Each shared instance of a document can be encrypted differently.

Figure 2:
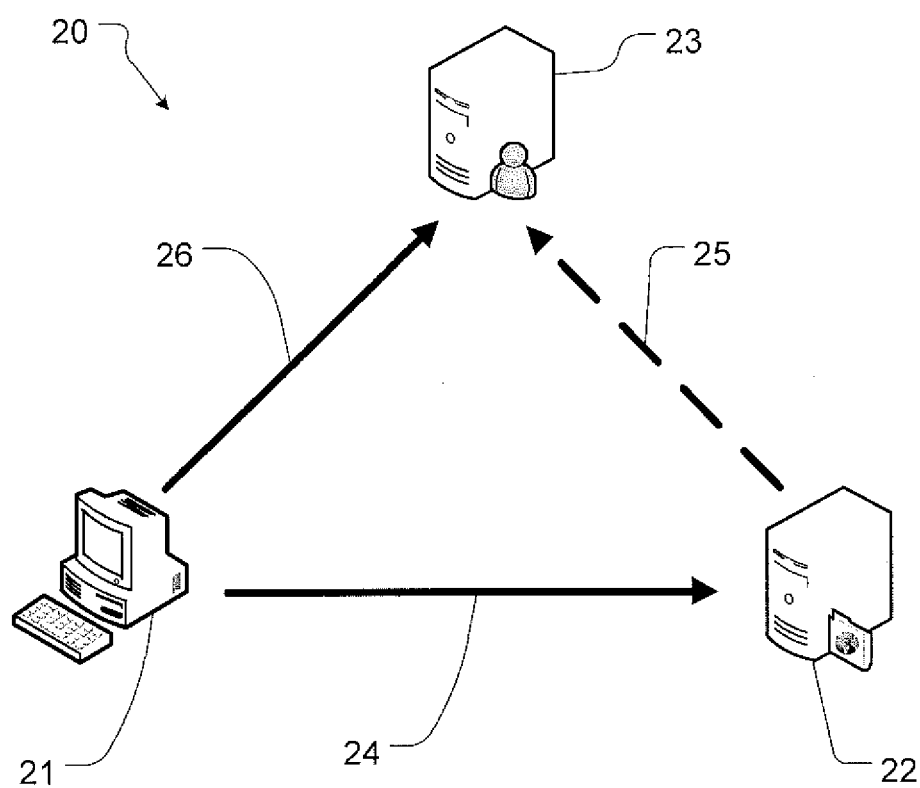
FIG. 2 shows the first communication device, the server and a further authentication server, according to another aspect of the invention.

In FIG. 2 the hardware system 20 is shown wherein by way of example the server is illustratively shown as a single server 22 and an additional authentication server 23. In this example only one client, i.e. a first communication device, is shown in the form of a desktop computer. Moreover, the total of communication links or data streams 24, 25, 26 are shown, being the server-client communication link 24 between the server 22 and the client 21, the server-authentication broker server link 25 between the server 22 and a local or remote authentication broker server 23, and the client-authentication server communication link 26 between the client 21 and the authentication broker server 23.

In FIG. 2 the communication devices 21, 22, 23 are shown that are arranged for sharing of digital content between these communication devices 21, 22, 23 in an internet network, the internet network comprising at least a server 22 and a first communication device 21. First, the first communication device 21, i.e. the client, initiates a secure connection 24, tunnel over the Internet to communicate with the server 22. All further communication between server 22 and client 21 is done over this secure tunnel 24. In particular, this is an Transport Layer Security, TLS, tunnel or a older type Secure Sockets Layer, SSL, tunnel.

Over the secure tunnel 24 the client 21 requests login credentials from a user of the client 21. The login credentials are received by the server 22 from the client 21 and preferably a remote authentication broker 23 validates the login credentials through a forward request over a secure (TLS) tunnel 25 between the server 22 and the authentication broker 23. Once the login credentials are validated, and the user is thus authenticated, the client requests the document, i.e. the digital content, from the server. The server 22 generates an instance of the document and generates a server key component. The client 21 then also generates a client key component. Both the server key component and the client key component are interwoven into a (symmetric) interwoven secure document key. The server 22 encrypts the instance of the document with this interwoven secure document key comprising the two keys, i.e. the client and server key component.

The encrypted instance of the document is then sent over the secure tunnel 24 to a sandbox environment of the software application running on the client 21. The client 21, receives from the server 22 the interwoven secure document key comprising the client and server key component, to decrypt the encrypted instance of the document within the sandbox environment on the client 21, such that the document can be used, within the sandbox environment by the user of the client 21.

The authentication is illustrated in FIG. 2 in a simplified manner. Depending on needs a different authentication model can be chosen and the digital content can be saved in different ways. Examples thereof are use of Active Directory wherein a federation is created and authentication is provided through a network login. However, web based authentication in the form of oAuth2 or form based authentication is also applicable. The software system then does not know true identity information of the users since these are stored external, only a username and password are known within the software system itself. And these are preferably encrypted. The authentication information is stored in a separate database. The authentication system uses claims and token based authentication wherein tokens are stored at server 22 or client side 21 and the token is represented in the form of a hash of a cookie or session. In such token based authentication, when a request is received, the server will authenticate the attached token with the request and will then search for the associated cookie and bring the information needed from that cookie. The software system can use different services as authentication broker 23, in the preferred embodiment, the form based authentication is used but for other onsite and private cloud solutions any oAuth2 authentication service can be used. Once authenticated, all communication 24 between clients 21 and server 22 are performed through an API by use of an API key. Once the user has logged-in into the system, i.e. validated the login credentials, the client 21 uses the token to communicate with the API of the system 22, 21. The tokens are machine/user dependent and thus very secure.

Once the encrypted instance of the document is decrypted at the client, within the sandbox environment, the document is still under full control of the user, i.e. the original owner of the document. Print screen is protected for example by monitoring the processes within the operating system at the client 21, e.g. MS Windows, OSX or a Linux OS. All known key combinations are monitored as well. Moreover, the clipboard of the OS is monitored and when images are detected, these are instantly replaced by black images when needed. Services like Twitter, Facebook and other (social media) applications can be disabled depending on document the user has opened. If a document is opened within a virtual machine or via a remote desktop, the system will not open a print screen protected document. These preferences like print screen protection and the like are stored in accordance with the document at the server 22. Also plural screen grabbing software and remote desktop software can be detected by the system on the basis of a dynamically loaded library making it possible to update the list when needed.

Documents can also be protected by time protection properties. The system does not use local systems clocks which can be manipulated but a time defined by the server 22. If a user is viewing a document that is time protection enabled, and the internet connection is lost or disconnected, the document is closed, unless the document is defined as to be opened offline.

Moreover, the system is able to revoke documents when the owner of the documents decides to. If for example documents are shared through the method according to the invention, and these documents have low restriction levels by which editing, printing, etc. is allowed the user could decide over time to stop allowing any action to be taken on the document. In the most comprehensive form the document can be revoked and the receiver loses all control. Any documents that have been decrypted at the client side are then removed such that no further actions can be taken by the receiver.

Location restriction is implemented in the form of geo-location protection by a two factor or two form authentication to validate that the correct user is in the correct area. It is thus possible for users to secure the document within a specific geographical area. This means that documents can only be used within that specific area and will be blocked when the area is left, or radius of the location is exceeded The client 21, e.g. a mobile phone, tablet, laptop or the like, that is known within the system, and validated, can be requested to verity the location via a local QR code. Preferably the code is refreshed every few seconds to make it hard to copy and send it to a different location. The client software uses a heartbeat system that sends the current location on regular basis and if the server detects that the user is changing locations within a few seconds, the geolocation protection prevents the document from being opened.

Print and Edit protection are dynamically added to the document when the document is opened, depending on the share permission of the user. The user cannot change the settings because the current document is always re-encrypted when the document is closed. The temporary files are processed in an area that the user cannot access and are only available when needed. If a document is not editable the user is can not copy and paste information in the document.

Previews of documents used on both the web and mobile clients are reloaded every time the user requests them. The protection settings are validated on the server and a preview is show when the user has access. Nothing is cached on the client side. When print screen protection is added to the document the client devices 21 turn of the possibility of creating a screen shot. The applications on the clients 21 do not allow opening on rooted or jail broken devices.

If the security settings are changed on a document the server 21 sends a secure message to all clients 21 connected to the user. All clients 21 react real-time to changes in settings, enable or disabling functions or if access is revoke the document will be closed. This is done in the applications them selves and not through push-notification services provided by Google and Apple. So the user cannot disable the messages.

All actions during the life span of the document are registered with the system. The system registers the following actions, opening of a document, printing of document, editing of document, print screen, sharing, closing of a document, etc. The location, user, and time of each event is also registered. If the user is not allowed to one of the following actions the system registers this as an attempt to do something. For example, a user tries to open the document outside of the allowed area. The system registers an unauthorized attempt to access the document. In the administration tool the admin is able to create reports on what has been done on the documents.

The server 22, optionally with use of an external server such as an authentication broker 23, can determine if a user belongs to a certain company, for example on the basis of the domain of the email address used in the login credentials. The system is then able to define certain restrictions or policies on the basis of company employees, e.g. users belonging to the same domain. For example, every employee may share documents unrestricted within the company, thus with other users of the same domain, but all with all other users only with time box or geolocation based restrictions.

Based on the above description, a skilled person may provide modifications and additions to the method and arrangements disclosed, which modifications and additions are all comprised by the scope of the appended claims.

What is claimed is:

1. A method of sharing digital content between communication devices in an internet network, the internet network comprising at least a server and a first communication device, the method comprising the steps of:
    initiating, by the first communication device, a secure tunnel over the internet for further secure communication between the first communication device and the server;
    requesting, by the first communication device, login credentials from a user of the first communication device;
    validating, by the server, the login credentials received from the first communication device;
    requesting, by the first communication device, the digital content from the server;
    generating, by the server, an instance of the digital content;
    generating, by the server, a server key pair comprising a private server key and a public server key;
    generating, by the first communication device, a client key pair comprising a private client key and a public client key;
    sending, by the first communication device, the public client key to the server;
    sending, by the server, the public server key to the first communication device;
    leveraging the public server and client keys for public-private key encryption as a transport layer for the following steps of:
    encrypting, by the server, the instance of the digital content, with an interwoven server side key component and a client side key component,
    transmitting, by the server, the encrypted instance of the digital content, to a sandbox environment within the first communication device;
    sending, by the server, the server key component, to the first communication device;
    decrypting, by the first communication device, within the sandbox environment the encrypted instance of the digital content with the interwoven server side and client side key components, for use by the user of the first communication device.

2. The method according to claim 1, the step of encrypting, by the server, of the instance of the digital content comprising the step of:
    generating, by the server, a document encryption key comprising an interwoven server side key component and a client side key component.

3. The method according to claim 1, further comprising the step of:
    determining, by the server, privilege parameters for the instance of the digital content, wherein the privilege parameters comprise one or more of the group of: internet connection requirement, print screen protections, copy/paste protection, clipboard protection, print protection, and wherein the sandbox environment is arranged to restrict use of the decrypted instance of the digital content on the first communication device in accordance with the privilege parameters.

4. The method according to claim 1, further comprising the step of:
    determining, by the server, time protection parameters for the instance of the digital content, wherein the time protection parameters comprise one or more of the group of: expiration time moment, expiration time duration, expiration time duration from time moment, and wherein the sandbox environment is arranged to restrict use of the decrypted instance of the digital content on the first communication device for a time duration in accordance with the time protection parameters.

5. The method according to claim 1, further comprising the step of:
determining, by the server, geolocation parameters for the instance of the digital content, wherein the geolocation parameters comprise one or more of the group of: a geolocation for use of the instance of the digital content, a radius for the geolocation, time protection parameters, and wherein the sandbox environment is arranged to restrict use of the decrypted instance of the digital content on the first communication device at a geolocation in accordance with the geolocation parameters.

6. The method according to claim 5, wherein the geolocation parameters further comprises a geolocation code, physically present at the geolocation, and wherein the method further comprises the step of:
sending, by the first communication device, the geolocation code at the geolocation to the server;
determining, by the server, whether the geolocation code corresponds to a geolocation code stored with the geolocation parameters of the instance of the digital content, for performing the step of decrypting, by the first communication device, within the sandbox environment the encrypted instance of the digital content upon matching geolocation code sent by the first communication device, and the geolocation code on the server corresponding to the instance of the digital content.

7. The method according to claim 6, wherein the geolocation code at the geolocation is provided as a QR code, and wherein the QR code is refreshed approximately every few seconds.

8. The method according to claim 1, further comprising the step of:
sending, by the first communication device, within a heartbeat system, periodically a current geolocation to the server approximately every few seconds.

9. The method according to claim 1, wherein the digital content shared between the communication devices is comprised of an image or video, and the method further comprises the step of:
dividing, by the server, the digital content into multiple blocks;
assigning, by the server, a position identifier to each of the blocks;
wherein the step of transmitting, by the server, of the instance of the digital content comprises transmitting, by the server, in one or more stream connections, the blocks to the client; and
wherein the method further comprises the step of recombining, by the first communication device, each of the blocks into the digital content on the basis of the position identifiers.

10. The method according to claim 1, wherein at least one of the communication devices is one of a mobile communication device, a smartphone, a tablet, a portable communication device, a laptop, and a personal computer.

* * * * *